3,400,315
MOTOR CONTROL DEVICE UTILIZING ERROR SIGNAL TO CONTROL MOTOR ENERGIZATION
Adrian R. Doucette, Garden City, N.Y., assignor, by mesne assignments, to the United States of America as represented by the Secretary of the Army
Filed Dec. 3, 1965, Ser. No. 511,569
4 Claims. (Cl. 318—18)

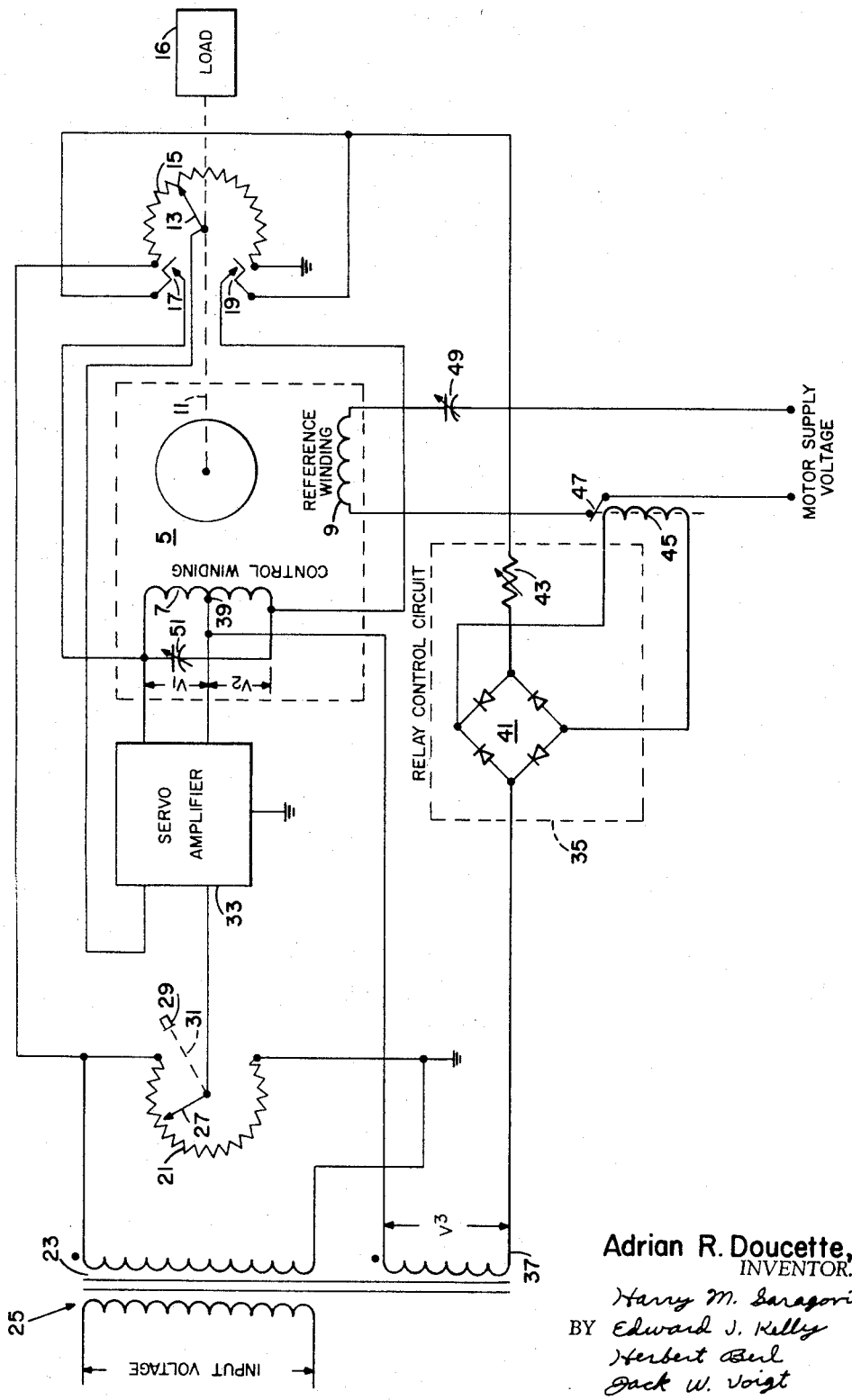

ABSTRACT OF THE DISCLOSURE

A limit switch circuit for limiting travel of a position-type servo system by relay means, before mechanical limit stops are reached. A moveable contact of a positioning potentiometer, connected to the output shaft of a servo motor, switches in a relay control circuit when the output shaft rotates to a preselected limit point in either direction of rotation. The relay control circuit is connected in series with a portion of the servo motor control winding and, when switched on, opens a relay switch in the servo motor supply voltage circuit. The motor is stopped until a reversing voltage is applied on the control winding.

---

This invention relates generally to a limit switch circuit and more specifically this invention relates to a circuit for electrically limiting travel of a position-type servo system.

The circuit according to this invention is a simple, inexpensive circuit which electrically limits the travel of a position-type servo system. Other arrangements require the use of auxiliary amplifiers and associated circuitry as complex as the servo itself. This circuit, because of its simplicity, is highly reliable. It is obvious that an electrical limit stop disconnecting the drive power before the mechanical limit stops are reached will reduce wear.

It is therefore an object of this invention to provide a circuit for electrically limiting the travel of a position type servo system.

Further, it is an object of this invention to provide an inexpensive limit switch circuit.

And, still further, it is an object of this invention to provide a more reliable limit switch circuit having fewer parts.

Other objects and many of the attendant advantages of this invention will be readily appreciated as the same becomes better understood by reference to the following detailed description when considered in connection with the accompanying drawing wherein the single figure is a schematic diagram illustrating a limit switch circuit according to the present invention.

In order to better understand the operation of the system described in the figure, a description of its components is first presented. Referring now to the figure there is shown a servo motor 5 inclosed in dashed lines having a control winding 7 and a reference winding 9. An output shaft 11 of motor 5 is connected to an adjustable contact 13 of a position indicating potentiometer 15 and to load 16. Limit contacts 17 and 19 are provided at the upper and lower limits respectively of potentiometer 15 which are actuated magnetically as contact 13 approaches the upper or lower extremity of potentiometer 15. The potentiometer 15 is connected in parallel with a second potentiometer 21 which is a control potentiometer. Both potentiometers are connected in parallel with winding 23 of input transformer 25. Potentiometer 21 has an adjustable contact 27 adjustable by a positioning knob 29 connected to contact 27 by means of shaft 31. Contact 27 is electrically connected to a servo amplifier 33. The output of servo amplifier 33 is connected to the control winding 7 of motor 5. The adjustable contact 13 of position indicating potentiometer 15 is also connected electrically to a second input of amplifier 33. The control winding 7 at the end connected to the output of amplifier 33 is connected through normally open upper limit switch 17 to relay control circuit 35 inclosed in dashed lines. The other end of winding 7 is connected through normally open lower limit switch 19 to relay control circuit 35. Relay control circuit 35 is connected to one end of winding 37 of input transformer 25. The other end of winding 37 is connected to a center tap 39 of control winding 7. The relay control circuit 35 consists of a rectifier bridge circuit 41 in series with an adjustable resistor 43. The output of bridge circuit 41 is connected to relay 45 which operates contacts 47 for controlling motor supply voltage to reference winding 9. An adjustable capacitor 49 is connected in the return path from winding 9 to obtain the quadrature phase for the winding 9 if the motor supply voltage does not have the proper phase relationship with respect to the input voltage. An adjustable capacitor 51 is connected across winding 7 to tune the motor control winding 7 to a unity power factor for best amplifier performance.

Operation

The operation of the invention occurs in the following manner. Servo amplifier 33 senses a difference in the voltage obtained from the control potentiometer 21 and the position indicating potentiometer 15 and amplifies this difference signal to a value sufficient to drive the servo motor 5 which drives the load 16 and the position potentiometer 15. As the voltage from the position potentiometer 15 becomes nearly equal to that set manually on control potentiometer 21, the difference signal becomes small reducing the motor 5 drive power. When the difference signal is reduced to a low level, motor 5 will no longer rotate.

If, for any reason, the difference signal could not be reduced to a minimum (for example, an intermittent contact), motor 5 would continue to drive the position potentiometer 15 until the lower limit switch 19 is actuated. Lower limit switch 19 completes the circuit between the source voltages $V_2$ and $V_3$ in phase addition, and the relay control circuit 35. Relay 45 is then actuated opening contacts 47, removing the voltage to the reference winding 9, thereby stopping the motor 5 and preventing the load to be driven against a mechanical stop which could be damaging to some devices especially if the difference signal is quite large causing the motor speed to increase as the mechanical stop is approached.

If subsequently, a reversing signal is obtained from the control potentiometer 21, the voltage $V_2$ will be in phase opposition to $V_3$, and relay 45 will be released, closing the circuit to the reference winding of the servo motor 5, permitting it to rotate.

A similar situation exists in the phasing of $V_1$ and $V_3$ when the upper limit switch 17 is operated.

Therefore it can be seen that by having a phase reversal in the output of the servo amplifier 33 the limit switches 17 and 19 can be released without extensive circuitry.

Resistor 43 adjusts the sensitivity of the circuit and therefore determines the magnitude of signal required by the relay control circuit 35 ($V_1+V_3$ or $V_2+V_3$ for operation; $V_1-V_3$ or $V_2-V_3$ for dropout).

While in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corre-

I claim:

1. A limit switch circuit comprising: a servo amplifier for amplifying a difference in voltage obtained from outputs of a control potentiometer and a position potentiometer connected to inputs thereof, said potentiometers being connected in parallel with a first secondary winding of an input transformer having its primary winding connected to an A-C voltage source; said control potentiometer having a manual positioning means for positioning an adjustable contact which is indicative of the necessary load position; a servo motor having a control winding and a reference winding; said amplifier having an output connected between one end and a center tap of said control winding, said control winding having an adjustable capacitor connected in parallel with said control winding for tuning said control winding to unity power factor, said servo motor having an output shaft connected to a load and said position indicating potentiometer for driving said load and said indicating potentiometer, said reference winding of said servo motor being connected to a motor supply voltage through normally closed contacts of a relay, said reference winding having an adjustable capacitor connected in series with said reference winding for providing quadrature phase with respect to said motor supply voltage, said relay being connected to an output of a relay control circuit, said indicating potentiometer having upper and lower limit switches actuated by an adjustable contact of said indicating potentiometer driven by said servo motor, one contact of each of said limit switches being connected in common to a first input of said relay control circuit, a second contact of each of said limit switches being connected respectively to opposite ends of said control winding of said servo motor, and a second secondary winding of said input transformer being connected between said center tap of said control winding and a second input to said relay control circuit whereby when either of said limit switches is actuated said relay control circuit is energized actuating said relay thus stopping said motor.

2. A limit switch circuit as set forth in claim 1 wherein said relay control circuit comprises: a rectifier bridge circuit, said bridge circuit being connected in series with a variable resistor; and a D-C output of said bridge circuit being the output of said relay control circuit.

3. In a positioning servo system having a servo motor with a control winding, a reference winding and an output shaft connected to position an adjustable contact of a position indicating potentiometer having upper and lower limit switches actuated by said adjustable contact of said potentiometer upon upper and lower extreme positioning of a load by said motor the improvement comprising: a relay control circuit having a first and second input, a voltage source connected between a center tap of said control winding and said first input to said relay control circuit, one contact of each of said limit switches being connected in common to said second input of said relay control circuit, a second contact of each of said limit switches being connected respectively to opposite ends of said control winding, said relay control circuit having an output connected to a relay, and said relay having a normally closed contact connected in series with said reference winding for stopping said motor upon actuation of either of said limit switches.

4. A limit switch circuit comprising: an amplifier; a first potentiometer; a second potentiometer; said first and second potentiometers being connected in parallel with a first voltage source; an output of each of said potentiometers being connected to inputs of said amplifier; a motor having a control winding and a reference winding; said amplifier having an output connected to said control winding; said second potentiometer being connected to an output shaft of said motor; a first and a second limit switch being positioned respectively at each extremity of said second potentiometer and being actuated upon extreme movement of said potentiometer in either direction by said motor; a first contact of each of said limit switches being connected respectively to opposite ends of said control winding; a second contact of each of said limit switches being connected in common to a first input of a switching means energized upon actuation of either of said limit switches, a second voltage source being connected between a center tap of said control winding and a second input to said switching means; said switching means having an output connected to a relay; and said relay having a normally closed contact connected in series with said reference winding for controlling connection of a third voltage source to said reference winding.

References Cited

UNITED STATES PATENTS 2,815,476  12/1957  Chesson _____ 318—20.500 X

ORIS L. RADER, *Primary Examiner.*

K. L. CROSSON, *Assistant Examiner.*